(12) United States Patent
Fijnvandraat

(10) Patent No.: US 7,765,017 B2
(45) Date of Patent: Jul. 27, 2010

(54) FUNCTION-WISE CONTROL OF AN APPARATUS FOR PROCESSING PHYSICAL DOCUMENTS

(75) Inventor: Hendrik Cornelis Fijnvandraat, Enschede (NL)

(73) Assignee: NEOPOST Technologies, Bagneux (FR)

( * ) Notice: Subject to any disclaimer, the term of this patent is extended or adjusted under 35 U.S.C. 154(b) by 383 days.

(21) Appl. No.: 11/295,712

(22) Filed: Dec. 6, 2005

(65) Prior Publication Data

US 2006/0167567 A1  Jul. 27, 2006

(51) Int. Cl.
  *G05B 11/01* (2006.01)
  *B65B 11/48* (2006.01)

(52) U.S. Cl. ............... 700/19; 700/9; 53/206; 53/460

(58) Field of Classification Search ............ 700/3, 700/9, 19, 20; 53/284.3, 460, 569, 206; 709/223, 709/224, 238; 271/2, 3.14; 358/1.1
  See application file for complete search history.

(56) References Cited

U.S. PATENT DOCUMENTS 4,170,791 A  10/1979  Daughton et al. ........... 364/900
4,989,852 A * 2/1991  Gunther, Jr. .................. 270/56
5,680,742 A * 10/1997  Hidding ....................... 53/460
6,885,910 B2 * 4/2005  Mayer ......................... 700/225
2002/0087228 A1 * 7/2002  Wiersma ....................... 700/95
2003/0214658 A1 * 11/2003  Wiersma et al. ............. 358/1.1
2005/0099657 A1 * 5/2005  Hudetz ....................... 358/1.12

FOREIGN PATENT DOCUMENTS

| EP | 0 160 167 A1 | 11/1985 |
| EP | 0 376 739 A2 | 7/1990 |
| EP | 0 778 523 A2 | 6/1997 |
| EP | 1 336 929 A1 | 8/2003 |

* cited by examiner

*Primary Examiner*—Charles R Kasenge
(74) *Attorney, Agent, or Firm*—Sughrue Mion, PLLC

(57) ABSTRACT

An apparatus for processing physical documents, comprising: at least two processing modules, at least two module control units, each arranged for controlling a processing module. The module control units are each provided with a function memory for storing function data and limitation parameters. The function data represent processing functions to be performed by the processing module. The limitation parameters represent limitations of the processing functions. The module control units are further arranged for receiving function control data and controlling the separate functions of the respective processing module on the basis of the function control data. The apparatus further comprises a central control unit which is arranged for sending the function control data to the module control units.

9 Claims, 9 Drawing Sheets

FUNCTION-WISE CONTROL OF AN APPARATUS FOR PROCESSING PHYSICAL DOCUMENTS

CROSS-REFERENCE TO RELATED APPLICATIONS

This application claims priority from Dutch Patent Application No. NL 1027671, filed on Dec. 6, 2004.

FIELD AND BACKGROUND OF THE INVENTION

The invention relates to an apparatus for processing physical documents, such as postal items.

Apparatuses for processing physical documents, such as postal items, generally have modular character in the sense that they are made up of a number of devices which are exchangeable with similar, but not wholly identical, devices which can perform partly corresponding and partly different operations. Consequently, such devices can be combined in a large variety of configurations.

Further, the apparatuses typically have a number of optional facilities, such as stations for folding, insert feeding or sorting, or facilities which some users do and some do not have at their disposal. This means that many designs of the control structure are necessary. Sometimes, moreover, complex adaptations are necessary to adapt the control structure, and in particular the control software, to new developments that were not anticipated in the original design. Users who, for the purpose of preparing messages, utilize equipment of third parties, for instance by contracting out the production of postal items as such and/or having it carried out in places close to the distribution area of the postal items, are moreover often faced, in a relatively short period of time, with equipment having different configurations and possibilities.

In addition, there are systems allowing particular stations to be simply removed temporarily or replaced with other stations. The product line marketed by applicant under the designation "SI-92", for instance, has a transport unit of the type TR-7 on which easily detachable insert feed units are placed.

Also, particular stations or functions of a device may be temporarily absent, for instance in that objects or substances to be fed have run out or are absent because of service or repair. This means that the control structure of an installed system must also be suitable to drive a particular individual device in different configurations.

Well-known are systems where the configuration of individual stations is automatically made known to a central control unit and the central control unit can drive the stations individually, as known, for instance, from European patent publication 1336929. In this document, an apparatus is described where a central control unit, with the aid of a program code, can drive a number of stations each separately. To that end, in program code for the central control unit, a separate processing control component is present for each of the respective stations. The processing control component can communicate with the station and drive the station.

A disadvantage of such an apparatus, however, is that the central control unit is to be provided with processing control components for driving a great multiplicity of types of processing modules. Also, when adding unknown types of processing modules, new software must be introduced for the control thereof, while upon removal of processing modules, superfluous program code remains present in the central control unit.

SUMMARY OF THE INVENTION

It is an object of the invention to provide an apparatus for processing physical documents which can be simply controlled in different configurations.

To that end, the invention provides an apparatus according to claim 1.

Such an apparatus can be simply driven in different configurations in that the module control units are arranged for receiving function control data and individually controlling the functions of a processing module on the basis of the function control data, and the apparatus further comprises a central control unit, which is arranged for determining and sending function control data to the module control units.

Thus, the central control unit drives the individual functions instead of a whole module. For each processing module, the processing step to be performed is made up of a selection of a limited set of functions, which are performed in a particular order, as, for instance, for a folding station: feeding in, folding and discharging. Thus, in the central control unit, only software needs to be present for driving a limited set of functions, compared with the possible amount of types of processing modules. As a result, the central control unit can drive a multiplicity of configurations of processing modules with a limited amount of software.

The invention further provides a method according to claim 10 and a computer program according to claim 11.

Specific examples of embodiments of the invention are laid down in the claims.

BRIEF DESCRIPTION OF THE DRAWINGS

Further details, effects and examples of the invention are discussed below, by way of illustration only, on the basis of the figures represented in the drawing.

DETAILED DESCRIPTION

Figure 1:
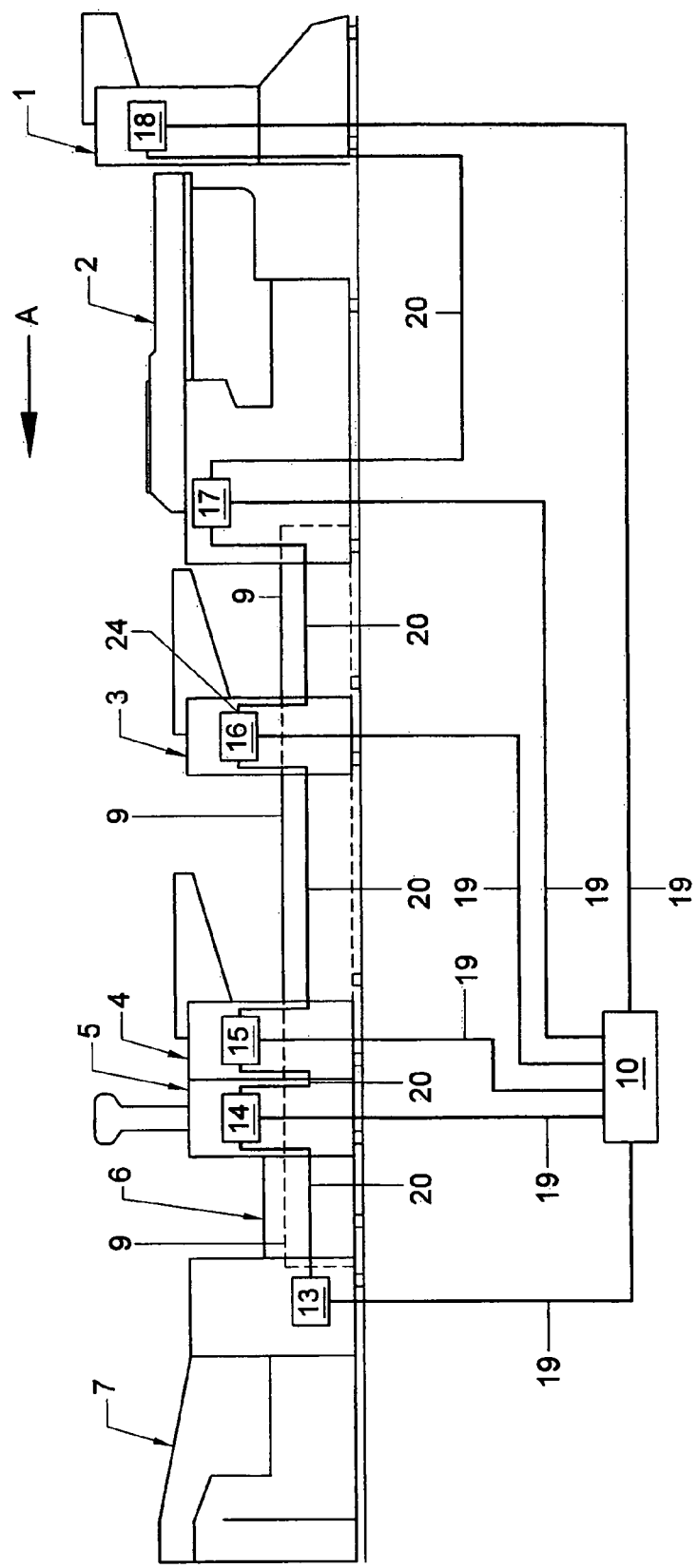
FIG. 1 shows a schematic side elevation of an example of an embodiment of an apparatus according to the invention.

In FIG. 1, an apparatus for processing physical documents, in this example postal items, is shown. The apparatus comprises a number of successive stations or processing modules 1-7. The stations or processing modules 1-7 are, in succession, a feed station 1 for feeding loose sheets, a collating station 2, a first and a second insert feed station 3 and 4, respectively, a folding station 5, a transport unit 6 and an inserter station 7. For the mechanical components of the apparatus shown, for instance stations can be used which substantially correspond in construction to stations of a product line commercialized by applicant under the designation "SI-92".

It is to be noted that many other configurations of processing modules can be used and the invention is not limited to the example shown. In particular, depending on the desired end product, processing modules can be removed or added. Also, the position of one or more processing modules in the processing flow of the physical document may be changed. For instance, the insert feed stations 3 and 4 may be replaced with a different type. Also, the feed station 1 and the collating station 2 could be replaced with a single processing module, or otherwise changes could be made in the configuration.

The feed station 1 is suitable for feeding loose sheets to the collating station 2. In the collating station 2, the sheets received from the feed station 1 can optionally be collated in stacks, for instance each forming a set of documents to be processed into a postal item. The sheets or stacks of sheets can then be passed along the insert feed stations 3 and 4, where, if desired, inserts are added. In the folding station 5, the sheets and inserts are folded. If sheets and inserts have been collated in a stack upstream of the folding station 5, they are folded simultaneously, as a stack. The transport unit 6 comprises a transport track 9, to which are coupled the inserter station 7, the folding station 5, the insert feed stations 3, 4 and the collating station 2. The folding station 5 and the insert feed stations 3, 4 have a greater width than the transport track 9 and have been placed from above over the transport track 9.

The example of an apparatus shown in FIG. 1 furthermore comprises a central control unit 10 and a number of module control units 13-18, each belonging to one of the stations or processing modules 1-7. The module control units 13-18 are each connected with the central control unit 10 through a data communication connection 19. Via the data communication connections 19, the central control unit 10 can send an instruction to the module control units 13-18. On the basis of the instruction given, the respective module control unit 13-18 controls the equipment present in the respective station 1-7. For instance, a module control unit 13-18 can switch on or switch off a check for double sheets, set the number of sheets to be dispensed per instruction or perform another operation.

The module control units 13-18 are further interconnected via a module communication connection 20. Via the module communication connection 20, adjacent module control units can exchange information. For instance, the module control unit 18 in the feed station 1 can pass on to the module control unit 17 of the collating station 2 that the feed station 1 has executed an instruction and no further feed will follow, or other information is exchanged.

Figure 2:
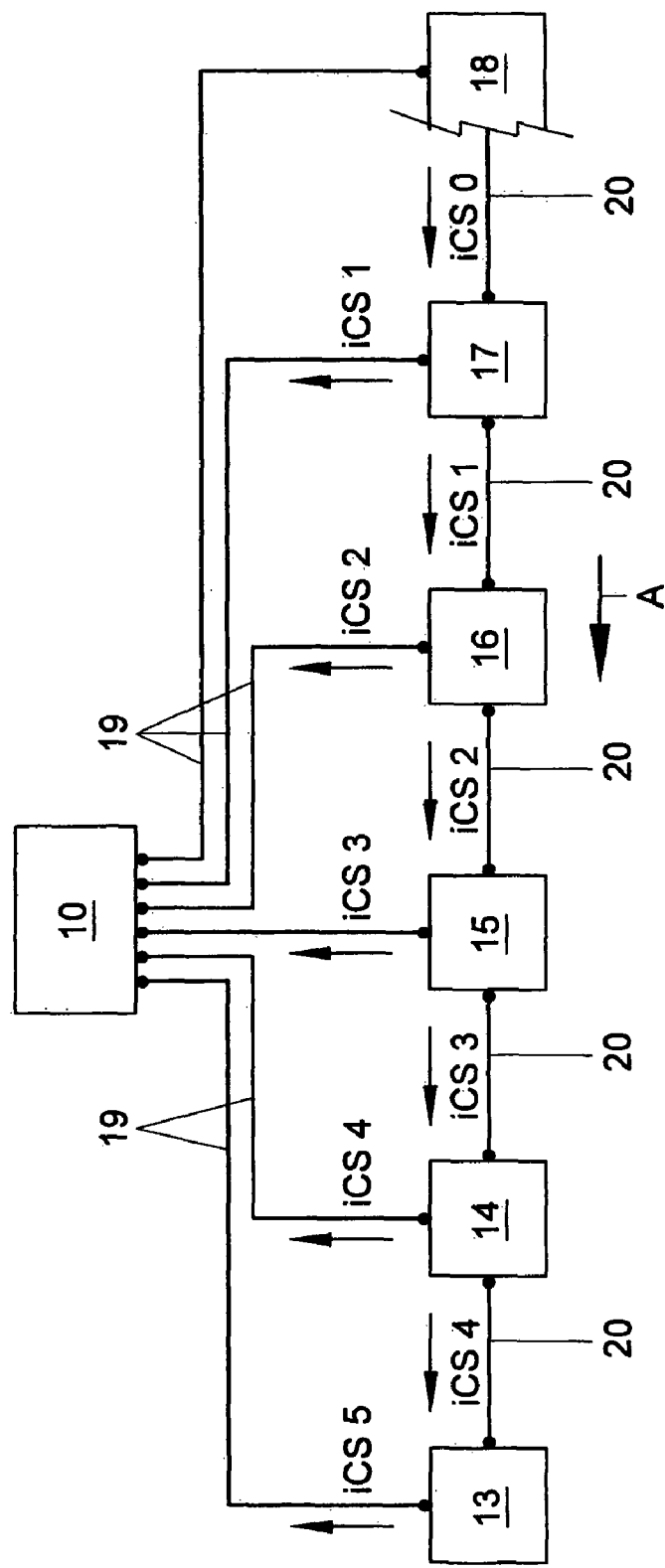
FIG. 2 schematically shows the topology of the data network that connects the control units in the apparatus according to FIG. 1.

The central control unit 10, module control units 13-18 and communication connections 19, 20 jointly form a data communication network in which the control units 10, 13-18 form nodes. The module control units 13-18 are connected in series via the module communication connection 20. Via the series connection of the module control units 13-18 formed by the module communication connection 20, a data flow between the module control units 13-18 can be effected. The data flow has a predetermined direction with respect to the processing direction A of the physical documents. In the example shown, the data flow direction corresponds to the processing direction A. The data flow direction can also be opposite to it or have a different suitable predetermined orientation with respect to the processing direction A. In the example of FIGS. 1 and 2, the adjacent nodes in the data communication network thus correspond to processing modules that are adjacent to each other in the processing direction A of the documents.

In the example of FIGS. 1 and 2, for instance the module control unit 18 of the feed station 1 and the module control unit 17 of the collating station 2 form adjacent nodes in the data communication network. The module control unit 17 is here situated downstream with respect to the module control unit 18 in the processing direction A of the physical documents, analogously to the position of the collating station 2 with respect to the feed station 1.

In the setup of stations 1-7 shown in FIG. 1, the module control unit 17 of the collating station 2 is further connected with the module control unit 16 of the first insert feed station 3. The module control unit 16 has as adjacent, downstream node the module control unit 15 of the second insert feed station 4. The module control unit 14 of the folding station 5 forms the downstream adjacent node of the module control unit 15 of the second insert feed station 4. The module control unit 14 of the folding station is connected directly with the module control unit 13 of the inserter station 7.

For driving an apparatus comprising a plurality of stations or processing modules, in addition to information regarding the stations or processing modules present, also the position of those stations or processing modules should be known at the central control unit 10. This is because the positions of the stations determine the order in which physical documents to be processed pass the stations, and hence the order of processing operations (for instance, adding a single-sheet insert prior to folding or, conversely, in the case of an insert in the form of a booklet, adding it after folding).

In the example shown in FIG. 1 the module control units 13-18 of the processing stations 1-7 are arranged to generate network configuration data and to send this via the module communication connection 20 in the processing direction A of the physical documents. The module control units 13-18 can also send network configuration data to the central control unit 10 via the respective data communication connection 19.

The network configuration data of the module control units 13-18 is generated as follows. At the start of the topology determination that is carried out by the example shown in FIG. 1, each of the module control units 13-18 sends a configuration request to the module control unit of the processing module 1-7 situated immediately upstream of the respective module control unit in the processing direction A of the documents. The module control unit 13 of the inserter station 7 thus asks the module control unit 14 of the folding station 5 for the network configuration data, the module control unit 14 asks module control unit 15 of second insert feed station 4, etc.

In the example of FIGS. 1 and 2, each module control unit 13-18 transmits a configuration request periodically. Thus, the central control unit 10 is quickly informed of modifications in the configuration of the apparatus. By virtue of this automatic, periodic configuration determination, the apparatus does not need to be shut down entirely to make a modification.

If a module control unit 13-18 does not receive a request from a module control unit of a processing module located further downstream, the module control unit establishes that it constitutes the module control unit of the most downstream processing unit. In the example of FIGS. 1 and 2, the module control unit 13 of the inserter station 7 will not receive a request and hence establish that it is the most downstream processing module.

If a module control unit 13-18 does receive a configuration request, then, in response to the received configuration request, the receiving module control unit also sends a configuration request upstream.

Also, the receiving module control unit can send an acknowledgement of receipt downstream to the sending module control unit. The sending module control unit then knows that upstream of it, at least one module control unit is present.

If at a particular time after sending the configuration request, the sending module control unit still has not received an acknowledgement, then the sending module control unit establishes in that case that it belongs to the most upstream processing module. In this example, the module control unit 18 of the feed station 1 is the most upstream unit.

In response to the configuration request, the interrogated module control unit determines the topology of an upstream part of the data communication network. This upstream part is situated upstream of the downstream processing module and contains the interrogated module control unit.

For instance, the interrogated module control unit can determine that topology on the basis of network configuration data which the interrogated module control unit has received from the module control unit which constitutes its upstream neighbor. For the interrogated module control unit knows that the interrogated module control unit constitutes the most upstream unit if no data are received from an upstream neighbor.

If the interrogated module control unit does receive network configuration data, the interrogated module control unit can simply determine the topology of the upstream part, since the network configuration is received from a module control unit that belongs to the upstream, immediately adjacent processing module. The interrogated module control unit can thus derive the topology of the upstream part from the received network configuration data and its position with respect to the module control unit whose network configuration data has been received, i.e. its upstream adjacent neighbor.

After the topology determination, the interrogated module control unit sends first network configuration data to the requesting downstream module control unit. The first network configuration data represents the topology of the upstream part.

In the example of FIGS. 1 and 2, the module control unit 18 of the feed station 1 establishes that it is the most upstream module control unit. After this, module control unit 18 sends network configuration data iCS 0 to the module control unit 17 of the collating station 2. On the basis thereof, the module control unit 17 determines network configuration data iCS 1 and sends it to the module control unit 16 of the first insert feed station 3. In response, module control unit 16 sends network configuration data iCS 2 to the module control unit 15 of the second insert feed station 4. Module control unit 15 sends network configuration data iCS 3 to the module control unit 14 of the folding station 5, which in turn sends network configuration data iCS 4 to the module control unit 13 of the inserter station 7.

After receipt of the first network configuration data, the requesting downstream processing module generates second network configuration data on the basis of the first configuration data and the position of the downstream processing module with respect to the upstream processing module, viz. immediately adjacent. At the module control unit of the downstream processing module it is therefore known that to the topology represented by the first network configuration data, the position of the downstream processing module can be added. This position is the node in the data network directly adjacent to the module from which the first network configuration data originates. On the basis of this information, the module control unit of the downstream processing module can compile the second network configuration data. The second network configuration data thus represents the topology of the part of the data communication network that contains the upstream processing module and the part situated upstream thereof.

Next, the downstream processing module sends the second network configuration data further downstream and/or to the central control unit 10. The central control unit 10 then determines on the basis of the received network configuration data the topology of the data communication network and the relative arrangement of the processing modules.

In the example of FIGS. 1 and 2, the network configuration data sent by the respective module control units contains information concerning types of processing modules present and the relative position of the types present. For instance, to that end, the first network configuration data can be sent as a string with identification numbers for types of processing modules, with the order of the numbers representing the position of the processing modules in the processing direction. A module control unit receiving the string can then add to the string an identification of the type of the processing module to which the receiving module control unit belongs. After this, the adapted string can be sent further downstream by the receiving module control unit. For instance, the number at the beginning of the string can represent the most downstream module, in which case the receiving module control unit can add the identification at the beginning of the string.

Also, the number at the end of the string could represent the most downstream module. In that case, the identification can be added at the end of the string. This has as an advantage that in data communication networks the data is often sent in the form of a data package. The beginning of the data package, the header, contains information about e.g. the destination and the sender, the network protocol by which the package has been transmitted, the length of the package, etc. Behind the header, then, are the actual data, also referred to as 'payload'. When adding data to the end of the string, it is not necessary to determine the correct position for addition of the data (to prevent the information being placed in the header). The information can be added at the end of the package and is then automatically in the correct position.

When using a string with type-identification, the central control unit 10 can contain a memory in which are stored identification numbers for different types of processing modules and optionally further data on the type of processing module belonging to a number. From the order of the identification numbers in the string, the central control unit 10 can then determine the topology of at least a part of the data communication network. In that case, the network configuration data itself does not need to contain extensive information about the processing modules and the amount of data sent over the network is reduced.

In the example of FIGS. 1 and 2, for instance the respective network configuration data iCS 0-iCS 5 can be built up as the following strings:

iCS 0=1, 00
iCS 1=2, 10,00
iCS 2=3, 20, 10,00
iCS 3=4, 20, 20, 10,00
iCS 4=5, 30, 20, 20,10,00
iCS 5=6, 40, 30, 20, 20,10,00

The first number in the string indicates how many processing modules are present in the part of the data communication network to which the network configuration data relates. The next numbers are the identification numbers of the types of processing modules. In this example, for instance the value 00 represents a feed station, the value 10 a collating station, the value 20 an insert feed station, the value 30 a folding station 5, and the value 40 an inserter station 7. From the order of the values, the order of the processing modules 1-7 can then be derived.

For instance, the topology of the whole data communication network can already be derived from the network configuration data iCS 5 which is sent out by the module control unit 13 of the most downstream processing module, the inserter station 7. In this example, it can be derived from it that a series of six processing modules are present, which, in the processing direction A, are of the types 00, 10, 20, 30, 40, i.e. the series contains in succession: a feed station 1 for feeding loose sheets, a collating station 2, a first and a second insert feed station 3 and 4, respectively, a folding station 5, a transport unit 6 and an inserter station 7.

It is also possible, however, that the central control unit 10 receives second network configuration data from several, at least two, downstream processing modules. In the examples of FIGS. 1-5, for instance all module control units 13-18 send the second network configuration data to the central control unit 10 via the data connections 19. In that case, the central control unit 10 can determine the position of the downstream processing modules on the basis of differences in the second network configuration. The central control unit 10 can for instance compare the dimensions of the respective second network configuration data. In the above-described example, the central control unit 10 can for instance derive that module control unit 17 is situated upstream of module control unit 16, since the length of the network configuration data iCS 1 is shorter than the length of the network configuration data iCS 2.

If two or more module control units each send network configuration data via a separate data connection 19 to the central control unit 10, the central control unit 10 can determine which module control units 13-18 are present and which of the data connections 19 belongs to which module control unit 13-18, since the network configuration data are different for each module control unit. If the topology of the data communication network is changed, for instance because data connections 19 are adjusted or the arrangement of the processing modules 1-7 is changed, the central control unit 10 can thus determine simply via which data connection 19 which module control unit 13-18 can be reached.

In the example of FIGS. 1 and 2, the central control unit 10 can for instance determine that the network configuration data comes from a processing module of the type that corresponds to the value at the beginning of the string and that the data connection 19 over which that data is received belongs to that type of module. Also, the central control unit 10 can derive the position in the data flow, and hence the processing flow, since the network configuration data also contains the information about the topology of the part upstream of the processing module.

In the example of FIGS. 1 and 2, the data connections 19 between the central control unit 10 and the module control units 13-18 are all point-to-point connections. As a consequence, the module control units 13-18 can all at the same time communicate with the central control unit 10. Thus, the central control unit 10 can receive network configuration data from a plurality of module control units 13-18 or drive a plurality of module control units 13-18 simultaneously.

Also, by virtue of the point-to-point character, the connections between the central control unit 10 and the module control units 13-18 can be of different types. For instance, it is possible that the apparatus simultaneously includes both module control units that communicate via a particular protocol, e.g. the USB protocol, and module control units that communicate via a different protocol, e.g. RS-232.

Figure 3:
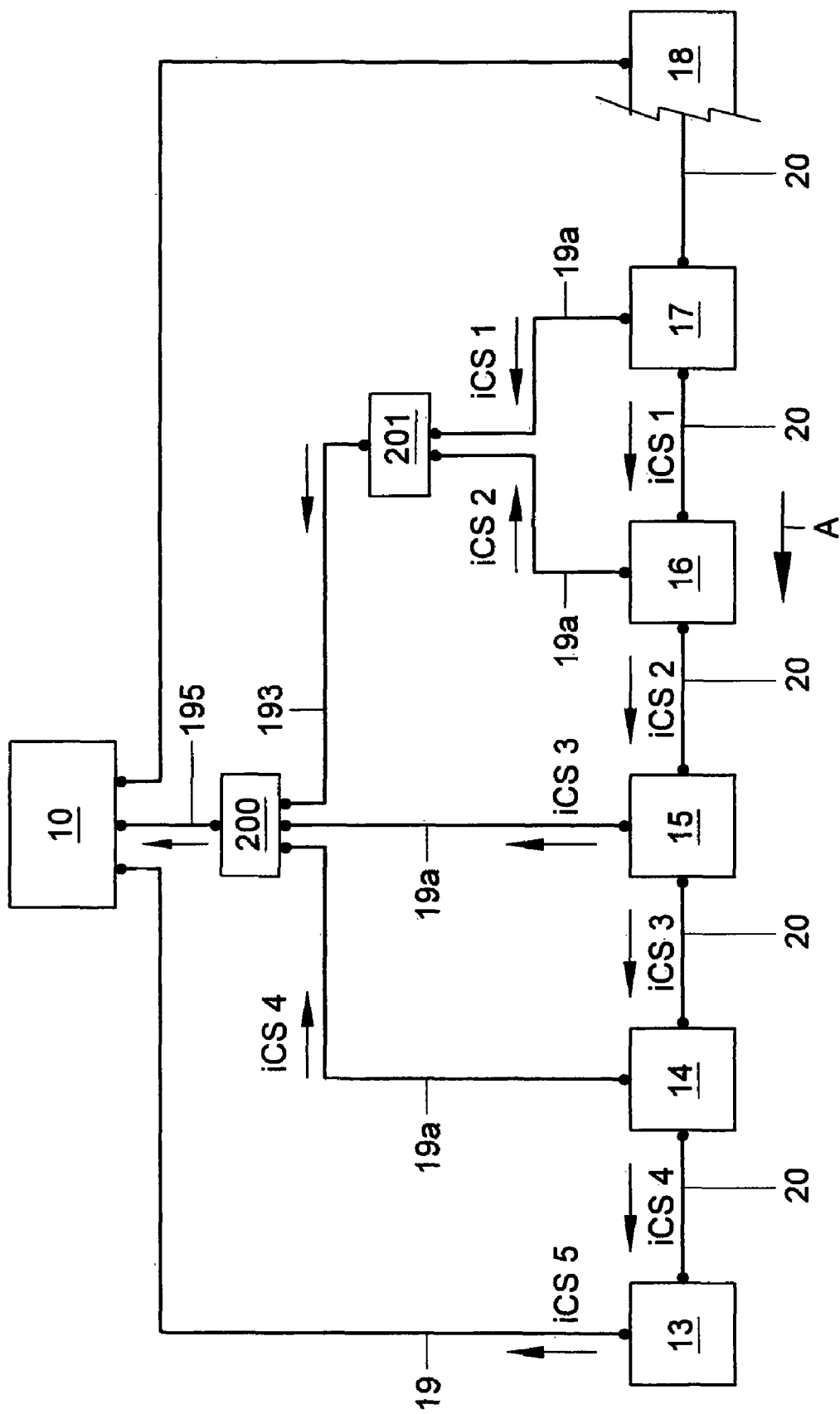
FIGS. 3-7 schematically show further examples of network configurations suitable for use in an apparatus or method according to the invention.

The central control unit 10 may also be connected with the module control units 13-18 in a different manner than shown in FIGS. 1 and 2. In the example of FIG. 3, for instance, between the central control unit 10 and the module control units 13-18 in the processing modules 1-7, a more complex network of data connections 19, 19a, 193, 195 is present.

In the example of FIG. 3, the module control unit 13 of the inserter station 7 is connected through a point-to-point connection 19 with the central control unit 10, and also the module control unit 18 of the feed station 1 is connected directly with the central control unit 10 via a point-to-point connection 19. The module control unit 14 of the folding station 5 is connected via a point-to-point connection 19a with a first network hub 200, and so is the module control unit 15 of the second insert feed station 4. The module control unit 16 of the first insert feed station 3 and the module control unit 17 of the collating station 2 are each connected through a point-to-point connection 19a with a second network hub 201. The second network hub 201 is connected through a data connection 193 with the first network hub 200. The first network hub 200 in turn is connected through a suitable data connection 195 with the central control unit 10.

In the example of FIG. 3, the network hubs 200, 201 can for instance be designed as Universal Serial Bus (USB) hubs. After initiation of the USB hubs and the connections 19a, 193, 195 connected thereto, in a manner known per se, according to the USB standard, the central control unit 10 can receive the network configuration data from the various module control units 13-18. From the received data, the central control unit 10 can derive which module control unit belongs to which connection. From the network configuration data it can be derived from which module control unit it originates, viz. the most downstream one in the network part that is described by that network configuration data. Also, the central control unit 10 can determine in which order the control signals are to be sent over the connections, viz. in accordance with the processing flow of the physical documents by the processing modules 1-7.

If the network configuration data contains the above-described strings, the central control unit 10 in the example of FIG. 3 can simply derive from which module control units 13-18 the network configuration data originates. The fact is that the connection over which the shortest string has come in belongs to the most upstream module control unit 18. The connection over which the longest string has come in belongs to the most downstream module control unit 13. The other connections, through sorting the strings according to length, can also be coupled to one of the module control units 13-18.

The system shown in FIG. 3 is simple to expand, for instance through addition of hubs, without necessitating extra direct connections (such as connections with reference numerals 19 and 195 in FIG. 3) with the central control unit 10.

As the central control unit 10 can determine which data connection belongs to which processing module 1-7, the connections between the central control unit 10 and the processing modules 1-7 can moreover be easily adapted.

Also, similar processing modules, despite their being mutually indistinguishable in type, can still be driven by the central control unit 10. This is because the central control unit 10 can derive from the network configuration data which type of processing module is located at which position in the data flow direction, and hence the processing direction, and which data connection belongs to which position. Thus, the central control unit 10 can still control the processing modules in the desired order.

Figure 5:
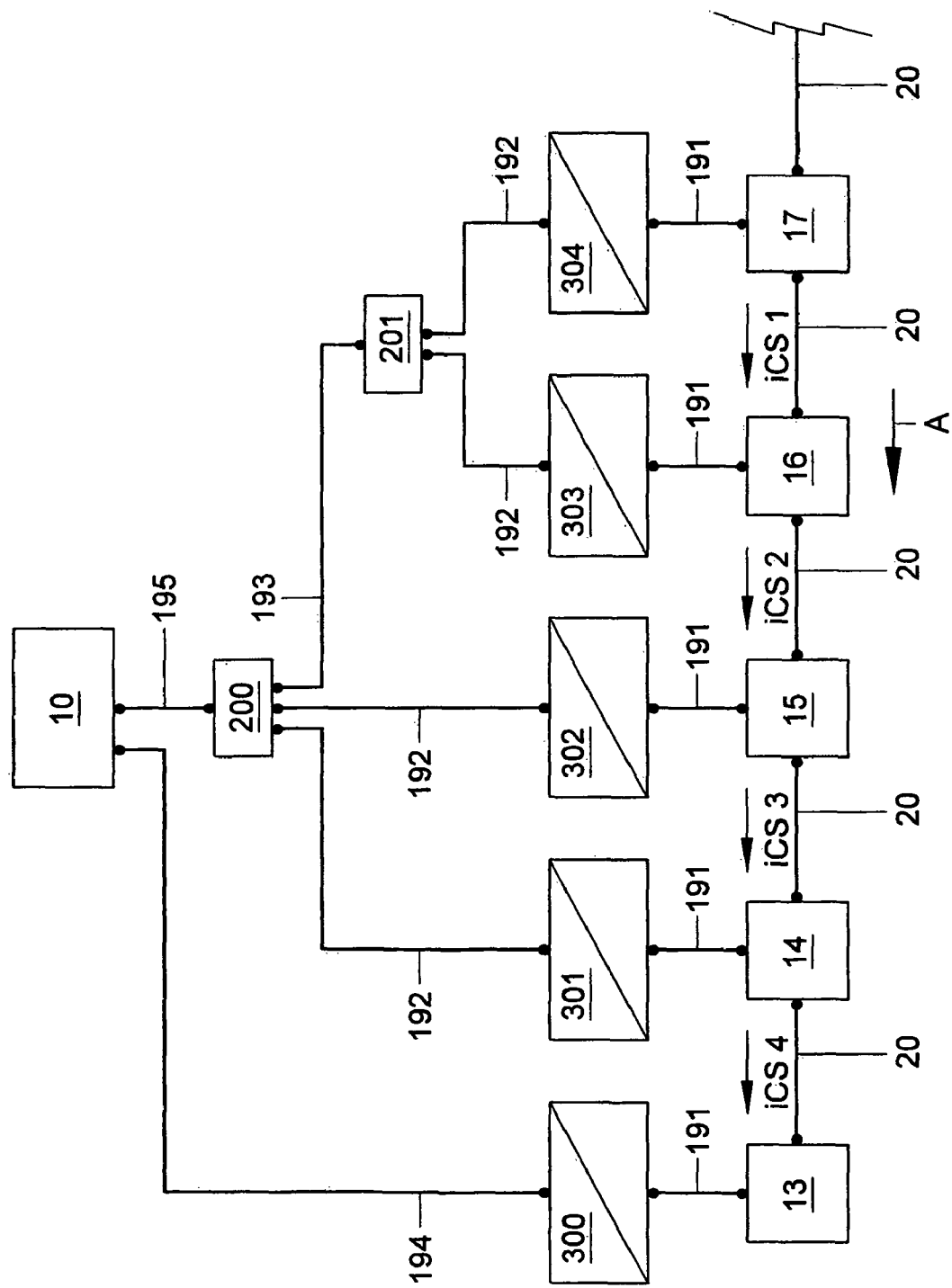

For instance, as shown in FIG. 5, it is possible in the example of FIG. 3 to place network converters 300-304, known per se, between the module control units and the connections. The network converters 300-304 convert data belonging to a particular network type to data belonging to a different network type, thus additionally allowing the use of processing modules that require a different type of network. For instance, the converters 300-304 can convert USB-compliant signals into RS-232 signals and vice versa. In the example of FIG. 5, the module control units 13-18 send signals to the central control unit 10 over respective RS-232 connections 191, also known as serial or COM ports. Via the RS-232 connections 191, each of the module control units 13-18 is connected with an adapter 300-304 which converts the RS-232 connections into USB connections 192-195.

Figure 4:
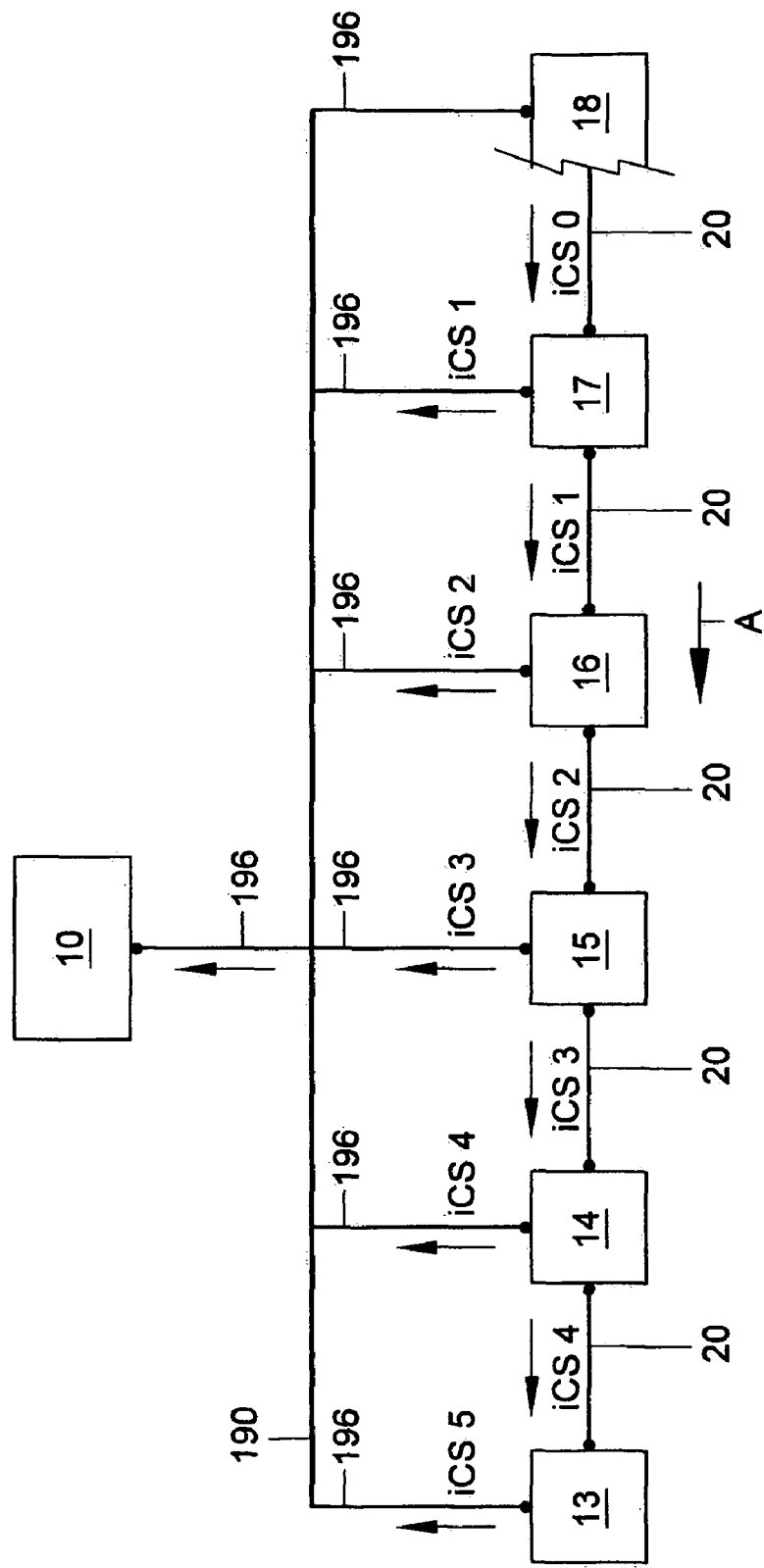

In the example of FIG. 4, the central control unit 10 is connected with the module control units 13-18 of the processing modules 1-7 through a self-configuring bus 190, i.e. a bus without fixed addresses (such as for instance a universal Plug and Play—UPnP, for short—bus). The central control unit 10 and the module control units 13-18 are connected with the self-configuring bus 190 through a connection 196.

Figure 6:
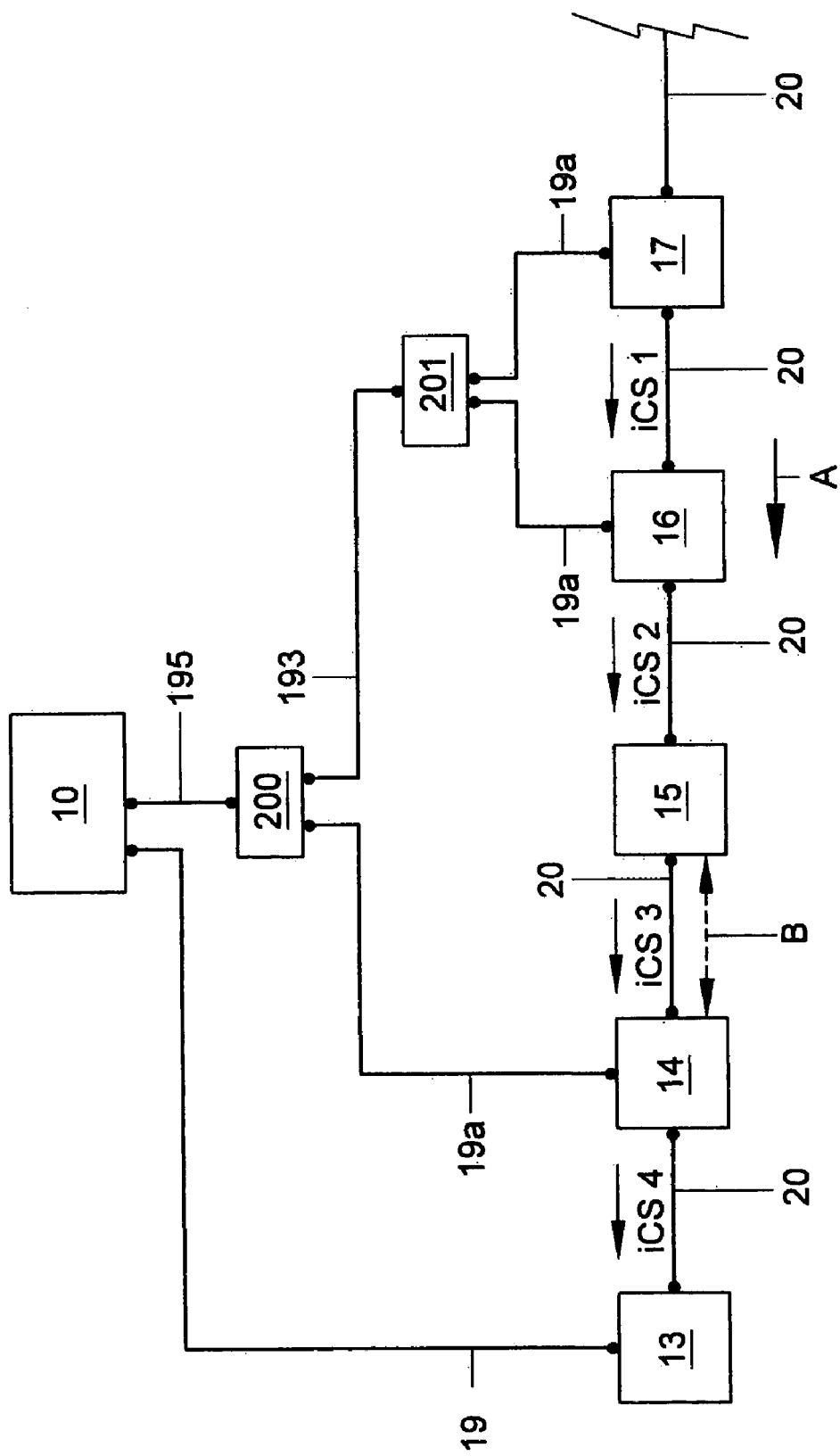

In the example of FIG. 6, the module control unit 15 of the second insert feed station 4 is non-directly connected with the central control unit 10. The central control unit 10 can determine from the network configuration data which processing modules are present in which order and via which data connection the central control unit 10 can communicate with a specific module control unit 13-18. Thus, the central control unit 10 can also determine via which route the non directly-connected module control unit 15 can also be reached. Thus, in this example, the non directly-connected module control unit 15 can be reached via the module control unit 14 of the folding station 5, as indicated with arrow B.

For instance, from the received network configuration data the central control unit can determine the topology and derive therefrom that from one or more non-directly connected processing modules no network configuration data has been received. The central control unit can then proceed to determine where non-directly connected modules are situated in the network and how these can be reached. When for instance the strings described hereinabove with reference to FIGS. 1 and 2 are used, then in the example of FIG. 6 the central control unit 10 will receive the following strings:

iCS 0=1,00
iCS 1=2,10,00
iCS 2=3,20,10,00
iCS 4=5,30,20,20,10,10,00
iCS 5=6,40,30,20,20,10,00

The module control unit 15 of the second insert feed station 4 in that case has not reported iCS 3 to the central control unit. From the strings the central control unit did receive, it can derive that between module control units 14 and 16 a module control unit is present. The processing module 14 which reported string iCS4 to the central control unit 10, can be seen by the central control unit 10. So, the central control unit 10 can derive that via that module the module control unit 15 of the second insert feed station 4 can be reached.

In the examples of FIGS. 1-6, the module communication connection 20 is a linear, unbranched connection, that is, each module control unit 13-18 is only connected with one upstream and one downstream module control unit, which thus form the adjacent upstream and downstream neighbors, respectively. However, the module communication connection 20 can also have a more complex structure and the module control units can have a plurality of module control units as upstream or downstream adjacent neighbor.

Figure 7:
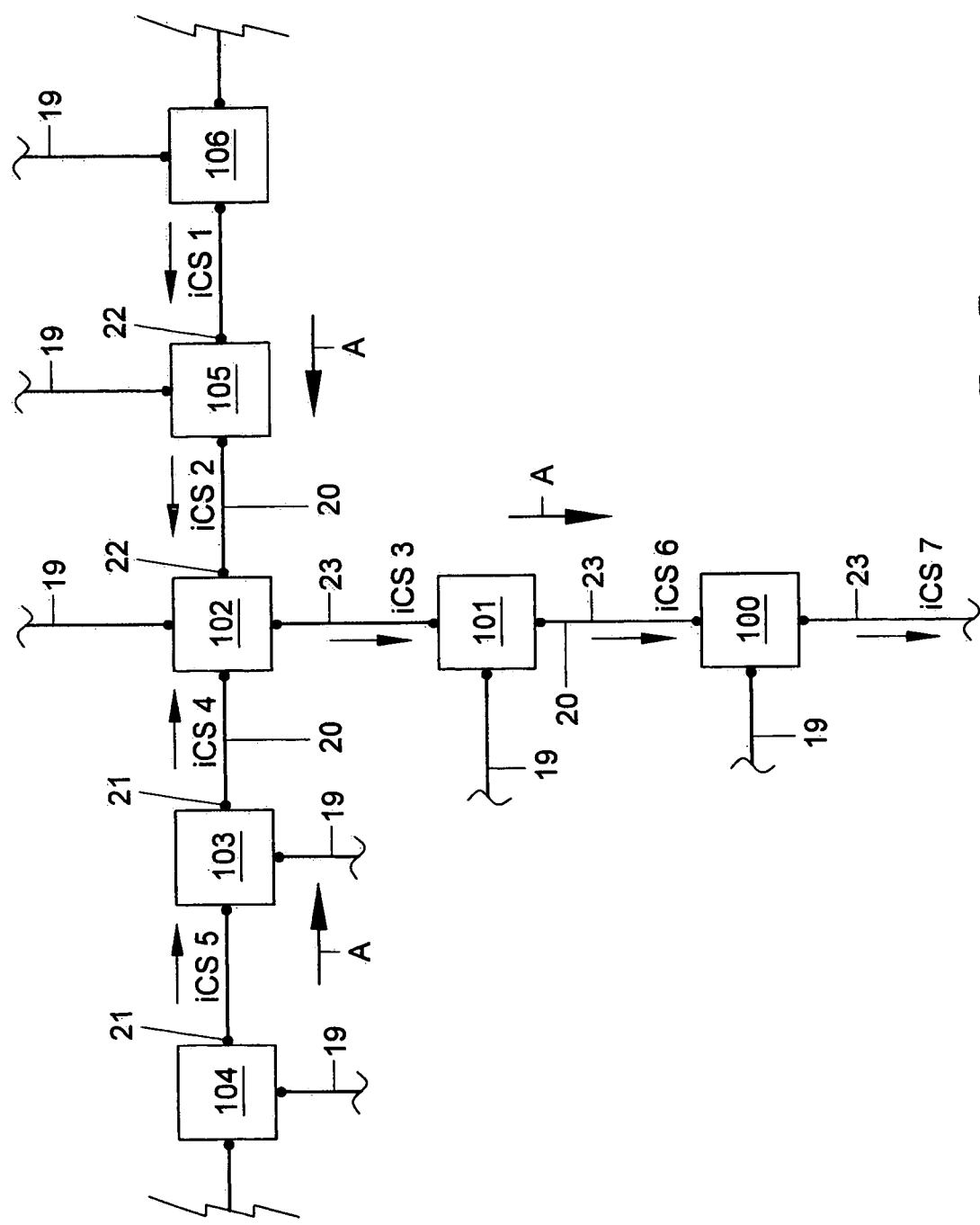

In the example of FIG. 7, the module communication connection 20 has upstream network branches 21, 22. The module control unit 102 has two upstream adjacent neighbors, viz. module control units 103, 105, each forming the downstream end of a network branch 21 or 22. The first network branch 21 contains two module control units 103, 104 and the second network branch 22 contains two module control units 105, 106. Downstream of the module control unit 102, the connection is unbranched, containing a linear connection 23 with two modules 101,100.

In the example of FIG. 7, in use, the module control unit 106 sends network configuration data iCS 1 to the module control unit 105. The module control unit 105 then sends network configuration data iCS 2 to the module control unit 102. The module control unit 104, in use, sends network configuration data iCS 5 to the module control unit 103, while the module control unit 103 then sends network configuration data iCS 4 to the module control unit 102. The module control unit 102 can send network configuration data iCS 3 to the module control unit 101. The module control unit 101 sends network configuration data iCS 6 to the module control unit 100. The module control unit 100 sends network configuration data iCS 7 to the central control unit 10, not shown in FIG. 7.

When the network configuration data contains the above-described strings, the network configuration data sent by module control units 100-106 shown in FIG. 7 can for instance be as follows:

iCS 1=1, 20
iCS 2=2, 10, 20
iCS 3=11, F9, 1, 50, F2, 2, 10, 20, FA, 2, 11, 20
iCS 4=2, 11, 20
iCS 5=1, 20
iCS 6=12, 30, F9, 1, 50, F2, 2, 10, 20, FA, 2, 11, 20
iCS 7=13, 40, 30, F9, 1, 50, F2, 2, 10, 20, FA, 2, 11, 20

Here, the first value in the string indicates the total number of values in the string. A value starting with F indicates an aspect of a branch. In this example, F9 indicates there is a branchpoint, F2 that the codes that follow relate to a right-hand branch and FA denotes that the codes that follow relate to a left-hand branch.

The network configuration data iCS 7 sent to the central control unit thus contains the following information: there are 13 values present in the string. The most downstream processing module is of a type 40 (for instance an inserter station), the adjacent upstream neighbor thereof is of the type 30 (folding station). Upstream of the folding station is a branchpoint (F9). This branchpoint contains one value, viz. the type of the point of branching, viz. type 50. The right-hand branch (F2) contains two values, viz. the most downstream one is a processing module of type 10 (feed station) and upstream thereof is a processing module of type 20 (insert feed station). The left-hand branch (FA) contains two values, viz. the most downstream one is a processing module of type 11 and upstream thereof is a processing module of type 20 (insert feed station).

In the example of FIG. 7, the central control unit 10 can determine via the data connections 19 which data connection 19 belongs to which module control unit 100-106. As has been explained hereinbefore in respect of FIGS. 1 and 2, the central control unit 10 can determine this in that the topology of the data network can be determined from the network configuration data. From the network configuration data it can also be determined from which position in the data communication network it originates. In the case of the above-described strings, the central control unit 10 can determine that the longest string (iCS7) originates from the most downstream module control unit 100, while the shortest strings (iCS 5, iCS 1) originate from the most upstream module control units 104, 106.

In the example of FIG. 7, module control units 104, 106 are located at symmetrical positions in the respective first and second network branch 21, 22 and the network configuration data iCS 5, iCS 1 is of equal form. To discriminate between the two module control units 104, 106, the central control unit 10 in this example, when determining that no discrimination is possible for two or more modules, sends a marking signal to one of the two module control units 104, 106 via the respective data connection 19. In response to the marking signal, the module control unit that receives the marking signal adds a value FF to its network configuration data. Assuming that the module control unit 104 receives the marking signal, the network configuration data in this example are as follows:

iCS 1=1, 20
iCS 2=2, 10, 20
iCS 3=12, F9, 1, 50, F2, 2, 10, 20, FA, 3, 11, 20, FF
iCS 4=3, 11, 20, FF
iCS 5=2, 20, FF
iCS 6=13, 30, F9, 1, 50, F2, 2, 10, 20, FA, 3, 11, 20, FF
iCS 7=14, 40, 30, F9, 1, 50, F2, 2, 10, 20, FA, 3, 11, 20, FF

The central control unit 10 then waits until the network configuration data iCS 7 are longer by one value and then determines again the combinations of data connections 19 and module control units 100-106 that are present. Since the network configuration data iCS 1, iCS 5 of the most upstream module control units 104, 106 differ now, the central control unit 10 can determine which data connection 19 belongs to which module control unit.

Figure 8:
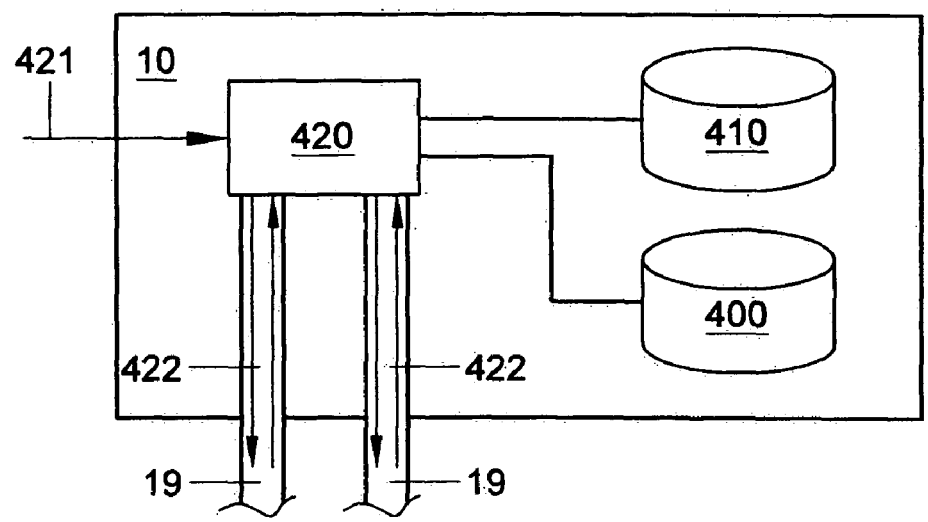
FIG. 8 schematically shows an example of a central control unit suitable for use in a method or apparatus according to the invention.

In addition to equipment for determining the topology, the central control unit 10 may further be provided with control equipment with which the module control units of the processing modules can be driven. FIG. 8 shows in more detail an example of such a central control unit 10. After the central control unit 10 has been provided with the topology of the data communication network, for instance with the above-described method or other suitable method, the information regarding the topology is stored in a topology memory 400 of the central control unit 10.

In the example shown, in addition to the topology memory 400, there is a function memory 410 present in the central control unit 10. In the function memory, function data can be stored. The function data represent properties of the elementary functions of which the processing of the physical documents is made up, such as document folding, feed-in, feed-through, discharge, addition of documents, reading of information on the document, collating documents or other functions.

For instance, in the function memory 410 a table may be stored listing the various functions and possible parameters therefor. The parameters may for instance be the limitations of the function (as, for instance, not more than three inserts, or particular dimensions of the physical documents), the function's input or its output, etc.

Also, in the function memory 410, types of processing modules may be stored and which functions are present in a particular type. For a folding station, the functions can be, for instance, feed-in, folding and discharge, while for an insert station the functions could then be: two inputs, merging and an output), and also what the limitations are of the functions in the processing module or other suitable information regarding the functions and/or the processing modules.

Thus, in the function memory 410, the so-called limitation parameters may be stored, for instance that processing modules of the type 'folding station' can perform the functions of folding, supply and discharge and that this is limited to sheets between A5 and A3 size, how many sheets can be folded simultaneously, to what size these can be folded, or otherwise.

Also, so-called metafunctions can be stored, which are functions that are based on the existence of a number of other functions. For instance, there may be a metafunction 'input linking', which utilizes several supplies with the same material to come to a supply of desired material, whereby first one of the supplies is used until it is empty, and then a switch to another supply is made.

In the example of FIG. 8, a function control unit 420 is connected with the topology memory 400 and the function memory 410. The function control unit 420 is further connected via outputs 422 with the data connections 19 to the module control units (of which, for simplicity, only two are shown in FIG. 8). On the basis of information in the topology memory 400 and the function memory 410, the function control unit 420 sends function control data to the module control units in the apparatus via the data connection 19. The module control units are arranged to receive the function control data and on the basis thereof to drive the different functions of a processing module individually.

Owing to the function control the central control unit 10, for the purpose of driving the processing modules, does not need to be familiar with a large number of types of processing modules, but only needs to know information regarding, compared with the number of different types of processing modules, a small set of functions (of which a great variety of processing modules may be made up). Also, new types of processing modules can be simply added, since the central control unit 10 only needs to know which functions are present in the new processing module.

In the example shown, in the function memory 410, the set of functions is stored, while, as described in more detail hereinbelow with reference to FIG. 9, in the individual module control units 13-18 it is stored what functions are present in the processing module 1-7 to which the module control unit 13-18 belongs. At a particular time, as at connection to the data communication network or initialization of the apparatus, the module control units 13-18 pass on to the function control unit 420 which functions are present in the respective processing module, after which this is stored in the function memory 410. As a result, the central control unit 10 is automatically informed of the functions in the apparatus and it can drive the linked-up processing modules virtually instantaneously.

Also, in the central control unit 10, the topology of the apparatus is known, so that not only the functions are known, but also the relative order of the functions in the processing flow of the physical documents.

Figure 9:
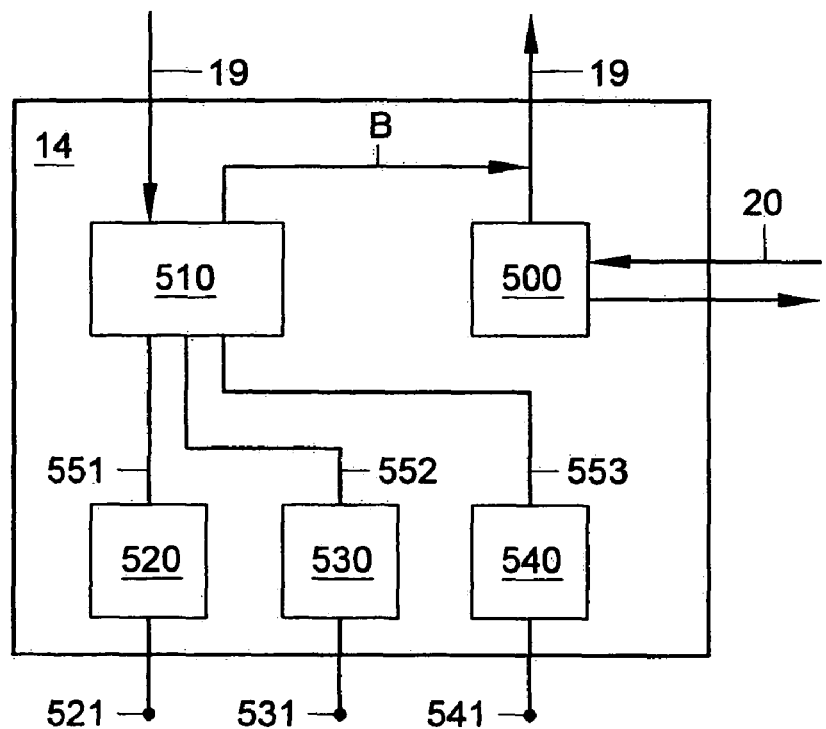
FIG. 9 schematically shows an example of a processing apparatus suitable for use in an apparatus or method according to the invention.

FIG. 9 shows by way of example a block diagram of the module control unit 14 of the folding station 5. The module control unit 14 comprises a function control unit 510 which is connected with the data connection 19 and via that connection receives the function control data from the central control unit 10. On the basis of the function control data the function control unit 510 drives control units 520, 530 and 540 which each control the parts of the folding station 5 belonging to a separate function. In this example, these are a feed control unit 520, a folding control unit 530 and a discharge control unit 540, with which the function control unit 510 is connected via respective connections 551-553. The control unit 520 can control the feed of physical documents, the control unit 530 the folding of the supplied documents, and the control unit 540 can control the subsequent discharge of the supplied (and possible folded) documents, each via respective signal outputs 521, 531 and 541.

The function control unit 510 can also, as indicated with arrow B in FIG. 9, send information about the functions present in the module via the data connection 19 to the central control unit 10. Also present in the module control unit 14 is a network configuration unit 500, which is connected with the module communication connection 20 and the data communication connection 19 and by which network configuration data can be received, generated and sent to the central control unit 10 and a downstream module control unit over the data connection 19 and the module connection 20, respectively. If desired, the function information may be integrated in the network configuration data, to which end, for instance, the network configuration unit 500 may be connected with the function control unit 510.

As shown in FIG. 8, the function control unit 420 has an input 421. Via the input 421, a processing instruction to the function control unit 420 can be entered. The control unit 420 determines on the basis of the processing instruction a set of instructions for one or more functions. To that end, the function control unit 420 determines from the topology memory 400 and the function memory 410 the functions present in the apparatus and their relative position in the processing flow of the physical documents. If desired, the function control unit 420 may already have determined these prior to the processing instruction, for instance at initialization of the apparatus, and have stored these data.

On the basis of the processing instruction and the functions that are present in the apparatus, the function control unit 420 determines a set of function control data, hereinafter called the 'recipe', such as which functions are to be used for executing the processing instruction, what these functions are to carry out, in which order the functions are to work, or otherwise, and to which module control unit the respective function control data belong.

The recipe is thereupon sent to the module control units via an output 422 of the function control unit 420. When the central control unit shown in FIG. 8 is used in the example of FIG. 1, the output 422 can for instance be connected through the data connections 19 with the module control units 13-18. In response to the received function control data, the module control unit then drives the individual functions in the order established by the function control unit 420.

For instance, a processing instruction may be that 30 documents are to be prepared with inserts 1-3, which are printed on A4 size and of which fifteen are to be inserted in a C5 size envelope, while the other fifteen are to be prepared without envelope. The function control unit 420 then determines the functions required for this and the order thereof, such as e.g. feed, insert feed and document folding to C5 size.

For instance, the product line that is commercialized by applicant under the designation "SI-76" includes an inserter station of the type IN-1 C. This type functionally contains inter alia the functions of 'inserter', 'folding' and 'feed-through'. The inserter function of the station type IN-1C can process C5 envelopes (the maximum envelope length is thus 162 mm) or deliver documents without envelope to the feed-through. Thus, when this type of inserter is present in an apparatus, the functions of 'inserter', 'folding' and 'feed-through' are present, which, when used in an apparatus according to the invention, can each be controlled individually.

For instance, the function control unit 420, when using an inserter of the type IN-1C in the apparatus, can determine that the function 'feed-through' is suitable for the documents that are not to be inserted in an envelope, while the function of 'inserter', which is only suitable for C5 size envelopes, requires that the function of 'folding' first folds incoming A4 documents to A5 size. The function control unit 420 can then control the functions 'folding' and 'inserter' and to that end send function control instructions to the inserter to control the folding function such that fifteen of the documents are folded to A5 size and instruct the inserter function to insert the units that come in at the inserter function in C5 envelopes, up to a total of fifteen, and then to switch itself off. The function control unit 420 can simultaneously send to the inserter a function control instruction for the function of 'feed-through' to feed through the units that come in at that function, up to a total of thirty, and then to switch off.

Figure 10:
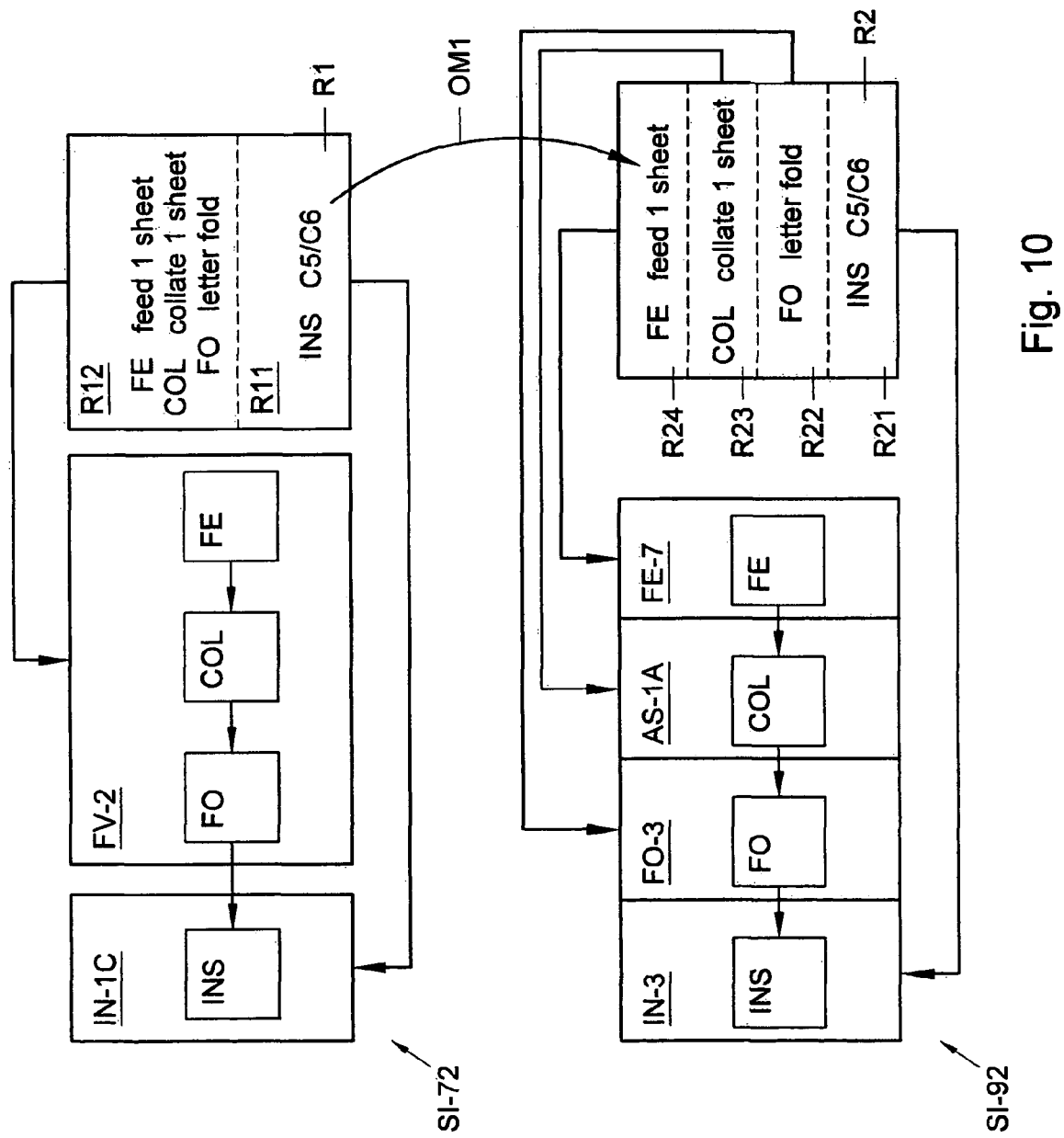
FIG. 10 schematically illustrates an example of converting a foreign recipe into a recipe suitable for the example of FIG. 1.

It is also possible that the central control unit 10 is arranged for receiving a recipe from a different system and converting the foreign recipe to a recipe suitable for the apparatus. As shown in FIG. 10 by way of example, for instance recipes for an apparatus of the type that is commercialized by applicant under the designation. 'SI-76' can be converted to recipes for an apparatus of the type that is being offered by applicant under the designation 'SI-92'. FIG. 10 shows schematically the structure of an SI-76, as well as that of an SI-92.

The SI-76 shown is made up of two stations, an inserter station of the type IN-1C, which is positioned downstream of a vertical station of the type FV-2. The vertical station FV-2 contains the functions: feed (FE), collate (COL) and fold (FO).

The SI-92 shown in FIG. 10 is made up of four stations, an inserter station of the type IN-3, which is positioned downstream of a folding station of the type FO-3. Upstream of the folding station is a collating station of the type AS-1A. At the beginning of the arrangement is a feed unit of the type FE-7. The feed unit FE-7 contains the function of feed (FE). The collating station AS-1A contains the function of collating (COL) and the folding station FO-3 the function of folding (FO). The inserter station IN-3 contains the function of inserting (INS). In the example of FIG. 10, the apparatus of the type SI-76 and the apparatus of the type SI-92 thus contain the same functions, but in the apparatus of the type SI-76 several functions are integrated in the vertical station FV-2.

In the example of FIG. 10, for the apparatus of the type SI-76 a recipe R1 has been drawn up. This recipe consists of instructions R11 for the function of the inserter station IN-1C and instructions R12 for the vertical station FV-2. The instructions R11 and R12, respectively, are sent to the respective station, as indicated with the arrows in FIG. 10. The instructions R12 for the vertical station FV-2 are made up of separate instructions for the three functions thereof. The instructions R12 sent to the vertical station FV-2 thus contain separate instructions for the various functions of the vertical station FV-2.

If the recipe were executed by the apparatus of the type SI-76, the feed function FE of the vertical station FV-2 receives, from among the instructions R12 for the vertical station FV-2, a command 'feed 1 sheet', via a function control unit not shown in FIG. 10. In response to this command, the function control unit controls the feed function FE such that one sheet is fed.

The collating function COL then receives, from among the instructions R12 for the vertical station FV-2, via a function control unit not shown in FIG. 10, a command 'collate 1 sheet'. In response to this command, the function control unit controls the collating function COL such that one sheet is collated.

The folding function FO of the apparatus of the type SI-76 in this case receives a command 'letter fold' from the instructions R12 for the vertical station FV-2 via a function control unit not shown in FIG. 10. In response to this command, the function control unit then controls the folding function FO, such that the sheet is folded to letter size.

When the recipe R1 is to be executed by the apparatus of the type SI-92, this recipe is converted by the central control unit 10 into a recipe R2 suitable therefor, as indicated with the arrow OM1. In this example, the functions of the apparatuses for which the recipes are intended are equal. Thus, at function level, no changes need to be made in the recipe R1. However, the functions of feeding, collating and folding are integrated in one station in the apparatus of the type SI-76. In the apparatus of the type SI-92, by contrast, a separate station is present for each of these functions.

Hence, on the basis of the information present in the function memory 410, the central control unit 10 converts the instructions R12 for the vertical system FV-2 into instructions R22-R24 for the feed station FE-7, the collating station AS-1A and the folding station FO-3. The resulting recipe R2 for the apparatus of the type SI-92 thus contains instructions R21 for the function of the inserter station IN-3, instructions R22 for the folding station FO-3, instructions R23 for the collating station AS-1A and instructions R24 for the feed station FE-7. The central control unit 10 then sends the instructions R21-R24 to the respective station, as indicated in FIG. 1 with the arrows.

In this example, the recipe R1 already contains function control instructions, so that the central control unit 10 only needs to determine to which module which function control instruction is to be sent. However, the central control unit 10 may also be arranged for a more complex conversion.

It is also possible that in the central control unit 10 predefined recipes are stored, which can for instance be used for frequently used processing instructions. When the configuration of the apparatus is adapted, the central control unit 10 can still use a predefined recipe. This is because the recipe is defined in terms of functions to be used and the central control unit 10 knows which function is present in which module. The central control unit 10 can thus determine simply which control data for the functions are to be sent to which module control unit.

It is possible that central control unit 10 sends function control data to a cluster of processing modules. One of the module control units in a cluster can in that case form a cluster control unit. The cluster control unit is arranged for controlling the module control units in the cluster which in turn can control the separate functions. The cluster control unit can comprise a memory in which data is stored which represents a cluster topology, as well as the functions present in the cluster. On the basis of function control data received from the central control unit 10, the cluster control unit can then drive the module control units in the cluster in a manner similar to that in which the central control unit 10 functions or in a different suitable manner.

The invention is not limited to the above-described examples. After reading the foregoing, many variants will readily occur to those skilled in the art. For instance, it will be clear that the central control unit and the module control units can be implemented in any suitable manner. The control units can for instance be designed as a programmable apparatus, such as a computer or otherwise, which is provided with computer program with which one or more of the above-described functions can be carried out. Also, the invention may be embodied in a computer program which, when loaded into a programmable apparatus, renders it suitable for carrying out a method according to the invention. The computer program can then be provided with a carrier, such as a data connection, an optical or magnetic data carrier or otherwise.

The invention claimed is:

1. An apparatus for processing physical documents, comprising:
    a reconfigurable arrangement of at least two removable processing stations, each arranged for performing at least one processing step with a physical document, wherein at least one single station has at least two physical document processing functions; and
    a central control unit which is arranged for determining and outputting function control data,
    wherein each station comprises a station control unit connected to the central control unit for receiving the function control data and controlling the functions of that station on the basis of the function control data,
    wherein the station control unit of said at least one single station having at least two physical document processing functions comprises a function control unit and processing control units each for controlling an associated part of the station performing one of the functions, and
    wherein the function control unit is arranged and connected to the processing control units for driving the processing control units on the basis of the function control data, and for controlling the parts of the station each belonging to a separate function for performing the respective function of the respective processing step.

2. An apparatus according to claim 1, wherein the central control unit comprises a topology memory, which topology memory is provided with topology data which represent a topology of available processing functions, topology data of an order of the available processing functions in a processing flow trajectory through the apparatus and topology data of a data communication network via which the station control units and the central control unit are communicatively connected with each other.

3. An apparatus according to claim 2, wherein the data communication network is arranged for at least passing on configuration data to the central control unit and the central control unit is arranged for determining the topology data on the basis of the configuration data.

4. An apparatus according to claim 1, wherein the central control unit is arranged for receiving a processing instruction, determining a set of instructions for one or more functions and sending function control data to the station control units.

5. An apparatus according to claim 4, wherein the set of instructions comprises: one or more processing functions to be used and an order in which the processing functions to be used are to be performed.

6. An apparatus according to claim 4, wherein the central control unit is arranged for receiving a foreign set of instructions from another system and converting the foreign set into a set suitable for the apparatus.

7. An apparatus for processing physical documents, comprising:
    a reconfigurable arrangement of at least two removable processing stations, each arranged for performing at least one processing step with a physical document, wherein at least one single station has at least two physical document processing functions; and
    a central control unit which is arranged for determining and outputting function control data,
    wherein each station comprises a station control unit connected to the central control unit for receiving the function control data and controlling functions of that station on the basis of the function control data, wherein the station control unit of said at least one single station having at least two physical document processing functions comprises a function control unit and processing control units each for controlling an associated part of the station performing one of the functions, wherein the function control unit is arranged and connected to the processing control units for driving the processing control units on the basis of the function control data, and for controlling the parts of the station each belonging to a separate function for performing the respective function of the respective processing step, and wherein at least one of the station control units forms a cluster control unit, which is arranged for controlling the station control units of a cluster of stations and which cluster control unit comprises a memory in which data is stored which represents a cluster topology.

8. A method for controlling processing of physical documents, comprising:

sending, by a central control unit, function control data to station control units, each arranged for controlling at least one station in a reconfigurable arrangement of at least two removable processing stations, which stations perform at least one processing step with a physical document, wherein at least one single station has at least two physical document processing functions;

receiving function control data in the station control units receiving function control data; and driving, by a function control unit of the station control unit of the at least one single station having at least two physical document processing functions, at least two processing control units of that station control unit on the basis of the function control data, the at least two processing control units each controlling an associated part of the at least one single station having at least two processing functions performing one of the at least two functions.

9. A data carrier having stored thereon, in a computer readable form, data which represent a computer program comprising program code for carrying out steps of a method according to claim 8 when the computer program is carried out by a programmable apparatus.

* * * * *

UNITED STATES PATENT AND TRADEMARK OFFICE
CERTIFICATE OF CORRECTION

PATENT NO. : 7,765,017 B2
APPLICATION NO. : 11/295712
DATED : July 27, 2010
INVENTOR(S) : Hendrik Cornelis Fijnvandraat It is certified that error appears in the above-identified patent and that said Letters Patent is hereby corrected as shown below:

(73) Assignee: Delete "NEOPOST TECHNOLOGIES" and insert --NEOPOST S.A.--

Signed and Sealed this
Fifteenth Day of February, 2011

David J. Kappos
*Director of the United States Patent and Trademark Office*